Nov. 8, 1949     J. MERCIER     2,487,575
UNLOADER VALVE
Filed May 12, 1943
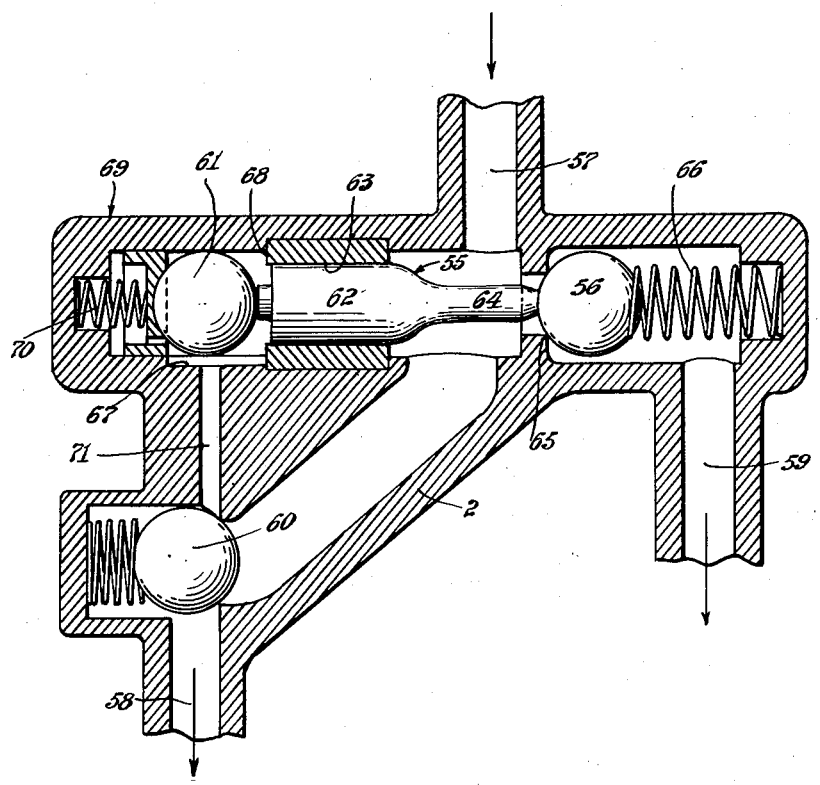
INVENTOR.
*Jean Mercier*
BY
*Howard L. Jeandron*
ATTORNEY Patented Nov. 8, 1949

2,487,575

UNITED STATES PATENT OFFICE 2,487,575

UNLOADER VALVE

Jean Mercier, New York, N. Y.

Application May 12, 1943, Serial No. 486,671

4 Claims. (Cl. 137—153)

This invention relates to a pressure regulating valve and more particularly to a valve which automatically maintains a fluid pressure in a device or system within a given constant range.

In my previous U. S. Patent No. 2,188,463, issued January 30, 1940, I have disclosed an improved valve means to regulate the pump output pressure. In this issued patent the particular feature is to provide a valve which will not only divert the flow of fluid from the pump when the utilization circuit has reached a maximum value, but at the same time provide a substantial release of the fluid pressure existing in the pump output line. In this patent the valve means comprised a slide valve or the like which was yieldably moved in one direction by the fluid pump pressure supplied and in the other direction by the force of a spring, thus the valving was accomplished by the alternating movement of the slide valve.

The resulting movements of the valve element are further influenced by the addition of an auxiliary movable element, which is subjected on one side to the pressure prevailing in the utilization circuit and on the other side to that prevailing in the delivery line of the pump, and the area of the surface subjected to the utilization pressure is to be equal or superior to the area of the surface subjected to the delivery pressure.

The present invention is a further improvement of these valve means. The principal object is to control the pressure in the utilization circuit and in the delivery line of the pump or the like in any desired manner and independently from each other while the pump operates at a constant rate.

It is a feature of my present invention that a first movable valve element will serve only to control the communication between the delivery line of the pump and an outlet port through which the fluid under pressure supplied by the pump may be discharged. The fluid discharged in this manner may be exhausted into the atmosphere or returned to the pump or to a storage device or the like and, by controlling the exhaust pressure in any conventional manner, the pressure in the delivery line of the pump can be released to any desired extent as long as the latter is in communication with said discharge port.

The communication between the delivery line of the pump and the utilization circuit is controlled by a second independent valve element.

The first movable valve element obstructs, in its normal position, the communication between the delivery line of the pump and a discharge port but, whenever the pressure in the delivery line of the pump or in the utilization circuit exceeds a predetermined value, yielding means maintaining said element in its normal position will be compressed and said element will be displaced so as to afford communication between the delivery line of the pump and the discharge port. This will produce a drop of pressure in the delivery line of the pump and as a consequence thereof the second movable valve element will obstruct the said delivery line.

It is a further feature of my present invention that the pressure in the delivery line of the pump will act on two surfaces of the first movable valve element, tending to displace the said element in two opposite directions.

It is then obvious that the relative area of said two surfaces is a determining factor for the way in which said valve will operate. If the area on which the delivery pressure acts so as to open the valve (i. e. to put the delivery line into communication with the discharge port) is larger than the other one, the valve will open as soon as the pressure overcomes the force of the yielding means and shut only after a predetermined drop in pressure has occurred in the delivery line. If, on the other hand, the area on which the delivery pressure acts so as to close the valve (i. e. to interrupt the communication between said delivery line and said discharge port) is greater, then the valve will never open under the direct action of the delivery pressure and an auxiliary valve element must be provided to produce the desired opening of the valve.

Such an auxiliary valve element will be subjected at least on one side to the fluid pressure prevailing in the utilization circuit and will transmit the action of this fluid pressure to the first mentioned movable valve element. The force so transmitted obviously depends upon the value of the pressure and the area of the surface of said auxiliary element to which said pressure is applied.

Whenever a displacement of the first movable valve element opens the valve, usually though not necessarily a substantial drop in pressure will occur in the delivery line. Consequently, the forces acting on the said first movable valve element by virtue of the delivery pressure will become less important. This, however, will not change the utilization pressure acting on the auxiliary valve element and the latter will act on the first movable valve element so as to keep the valve open until the pressure in the utilization circuit has, for some reason, entirely independent from the valve means which are contemplated here, decreased to a predetermined value.

By an appropriate choice of (1) The areas of the two aforesaid surfaces of the first movable valve element which are subjected to the utilization and/or delivery pressure;

(2) The area of the auxiliary valve element subjected to the delivery and/or utilization pressure;

(3) The strength of the yielding means; a practically unlimited range of pressure conditions can be obtained. By selecting these three principal factors, the valve can be made so as to open readily, that is, by slight increments of the delivery pressure (i. e. the pressure prevailing in the delivery line and in those parts of the valve which are in communication with the same), or the contrary. And independently therefrom, the valve can be made so as to close readily, that is, under the effect of a slight drop in the utilization pressure (i. e. the pressure prevailing in the utilization circuit and those parts of the valve which are in communication with the same), or the contrary.

These three factors could be so chosen that the valve will close only after the pressure in the utilization circuit has practically disappeared. Such a valve would have to be provided with means to displace the first movable valve element manually from the outside. A valve of that kind could be used in cases in which any excess pressure in the utilization circuit could lead to extremely serious damage.

Further features of my present invention may be gathered from the description of two embodiments given by way of example and illustrated in the accompanying drawings.

The figure illustrates a modified embodiment which is particularly adapted to insure a rapid reloading of the utilization circuit whenever the pressure therein has dropped below a predetermined value.

I have found of particular advantage the using of this arrangement when some fluid-actuated devices are to be operated permanently or at least for a considerable length of time while others are needed only occasionally and for a relatively short time. In such a system, the first utilization circuit may consist principally in a suitable storage device for fluid under pressure. In this storage device, fluid under pressure may be stored under the highest pressure which the source of fluid under pressure can supply. The second utilization circuit may include one or more fluid-actuated devices to be operated for considerable lengths of time under a pressure lower than the top pressure available from the source of fluid under pressure. Thus for instance, on aircraft, the first utilization circuit may be used, for actuating a retractible undercarriage or the like and the second circuit for operating a Sperry gyroscope.

In the figure the movable valve element is divided into two portions 55 and 56. Fluid is admitted into the valve through delivery port 57 and is normally discharged therefrom through the principal discharge port 58 which is connected to the principal utilization circuit. Ball valve 60 obstructs the communication between ports 58 and 57 whenever the pressure in port 58 exceeds that in port 57.

Valve element 55 has a piston-like portion 62 slidably engaging a cylinder bore 63, and also has a projection 64 contacting ball 56 and adapted to lift the same from its seat 65 against the force of spring 66 when element 55 is displaced. When this occurs, fluid delivered through port 57 can leave through an auxiliary discharge port 59 connected to the outside or an auxiliary utilization circuit.

The cross sectional area of seat 65 is somewhat smaller than that of bore 63.

Ball 61 constitutes an auxiliary valve element which is normally carried in an extension 69 of the valve casing 2 and forced by spring 70 against portion 62 of element 55. The sensitivity of the valve depends, amongst other factors, upon the strength of spring 70; that is, whether the valve will open more or less readily. Extension 69 communicates through opening (or openings) 67 and conduit 71 with port 58.

In operation, when the pressure acting on element 56 and the strength of spring 70 overcome the strength of spring 66, element 56 is lifted from its seat and element 55 is displaced accordingly. This will cause the communication between ports 58 and 57 to be interrupted by ball 60. The utilization pressure will continue to act on portion 62 of element 55 and cause a further displacement thereof until element 61 is applied against seat 68. As soon as this occurs the utilization pressure will act on the active surface of element 61.

The area of valve seat 65 determines the effective area of valve 56 that is acted upon by the pump pressure to open the valve, and the effective areas of the plunger 62 balance out. The area of valve seat 68 determines the effective area of auxiliary valve 61 that is acted upon by the utilization circuit pressure after the check valve 60 has closed. This pressure from the utilization circuit on valve 61 tends to hold valve 56 open. If the ratio of valve seat 65 to valve seat 68 were 1:2 then the ratio of opening and closing pressures would be 2:1.

The valve 56 will be firmly maintained in an open position until the pressure in the utilization circuit drops below a predetermined value. When that occurs spring 66 will force valve elements 56 and 55 back into their normal position. The return movement of element 55 will lift element 61 from seat 68.

The structure including a ball-shaped auxiliary element 61 affords an advantageous seal whereby leakage along piston 62 can be avoided.

My invention is not limited to the embodiments shown in the present specification. It comprises all changes which may be made without departing from its novel features as comprehended within the scope of the appended claims.

What is claimed is:

1. Unloader valve for controlling the pressure in the delivery line of a source of fluid under pressure, and, independently therefrom, the pressure in a utilization circuit to be fed from said delivery line which comprises a casing, three ports in said casing of which one is connected to said delivery line, a second to said utilization circuit, and a third to the outside, a first movable valve having means to normally bias same to a closed position inside said casing adapted to control the communication between said first mentioned port and said third port, a second movable valve means inside said casing adapted to control the communication between said second mentioned port and said first port, a piston element inside said casing connected on the one side to said first port and connected on the opposite side to the utilization circuit and said second port so that the delivery pressure acts on two surfaces in opposite directions when said second mentioned valve is open, and further an auxiliary movable valve means inside said casing adapted to transmit through said piston element to said first mentioned movable valve means the utilization pressure in one direction when said auxiliary valve is in contact with its seat, and yielding means inside said casing exerting on said first mentioned movable valve means a pressure opposite to said fluid pressure from said first port, and yielding means inside said casing exerting on said second mentioned movable valve means a pressure opposite to said delivery fluid pressure, and yielding means inside said casing exerting a pressure on said auxiliary movable valve means to seat same, and said auxiliary movable valve means including one surface subjected to the utilization pressure when said auxiliary movable valve means and said second movable valve means are closed.

2. Unloader valve for controlling the pressure in the delivery line of a source of fluid under pressure and, independently therefrom, the pressure in a utilization circuit to be fed from said delivery line which comprises a casing, three ports in said casing, one of which is connected to said delivery line, a second to said utilization circuit, and a third to the outside, a first movable valve element having means to normally bias same to a closed position inside said casing adapted to control the communication between said first mentioned port and said third port, a seat for said first movable valve element a second independent movable valve element inside said casing adapted to control the communication between said second mentioned port and said other ports, a piston element mounted in said casing and connected on the one side to said first port and connected on the opposite side to the utilization circuit and said second port so that the delivery pressure acts on two surfaces in opposite directions when said second mentioned valve is open, and an auxiliary movable valve element inside said casing adapted to bear against said piston element and to transmit through said piston element to said first mentioned movable valve element a force tending to hold the latter open after it has been displaced by said fluid pressure so as to afford communication between said first mentioned port and said third port, and yielding means inside said casing exerting on said first mentioned movable valve element a pressure in the opposite direction, a seat for said auxiliary movable valve element, said auxiliary movable valve element including one surface subjected to the utilization pressure when said auxiliary valve element and said second valve element are closed, the effective area of said surface being at least equal to the areas of said first movable valve element.

3. Unloader valve for controlling the pressure in the delivery line of a source of fluid under pressure and, independently therefrom, the pressure in a utilization circuit to be fed from said delivery line which comprises a casing, three ports in said casing of which one is connected to said delivery line, and another to said utilization circuit, and a third to the outside, a first movable element having means to normally bias same to a closed position inside said casing and adapted to control the communication between said first mentioned port and said third port, a seat for said first movable valve element a second movable valve element inside said casing adapted to control the communication between said second mentioned port and said other ports, a piston element mounted in said casing and connected on the one side to said first port and connected on its opposite side to the utilization circuit and said second port so that the delivery pressure acts on two surfaces in opposite directions when said second mentioned valve is open, and an auxiliary movable valve element inside said casing adapted to bear against said piston element and to transmit through to said first mentioned movable valve element a force tending to hold the latter open after it has been displaced by said fluid pressure so as to afford communication between said first mentioned port and said third port, a seat on which said auxiliary valve rests when said first mentioned valve has been opened, said auxiliary movable valve element being subject to the utilization circuit pressure on one surface when it is seated and said second valve element is closed, the effective area of said auxiliary valve element being greater than the effective area of said first movable valve element.

4. Unloader valve for controlling the pressure in the delivery line of a source of fluid under pressure, and, independently therefrom, the pressure in a utilization circuit to be fed from said delivery line which comprises a casing, three ports in said casing one of which is connected to said delivery line, and another to said utilization circuit, and a third to the outside, a first movable valve having means to normally bias same to a closed position inside said casing and adapted to control the communication between said first mentioned port and said third port, a seat for said first movable valve element a second movable valve means inside said casing adapted to control the communication between said second mentioned port and said other ports, a piston element mounted in said casing and connected on the one side to said first port and connected on its opposite side to the utilization circuit and said second port so that the delivery pressure acts on two surfaces in opposite directions when said second mentioned valve is open, and auxiliary movable valve means inside said casing adapted to bear against said piston element and to transmit through to said first mentioned movable valve means a force tending to hold the latter open after it has been displaced by said fluid pressure so as to afford communication between said first mentioned port and said third port, a seat on which said auxiliary valve rests when said first mentioned valve has been opened, said auxiliary movable valve element being subjected to the utilization circuit pressure on one surface when it is seated and said second valve element is closed, the effective area of said auxiliary valve element being greater than the effective area of said first movable valve element and yielding means inside said casing exerting on said first mentioned movable valve means a pressure in the opposite direction.

JEAN MERCIER.

REFERENCES CITED

The following references are of record in the file of this patent:

UNITED STATES PATENTS

| Number | Name | Date |
|---|---|---|
| 726,841 | Ball | May 5, 1903 |
| 2,210,295 | Johnson | Aug. 6, 1940 |
| 2,264,375 | Hill | Dec. 2, 1941 |
| 2,316,445 | Marshall | Apr. 13, 1943 |

FOREIGN PATENTS

| Number | Country | Date |
|---|---|---|
| 478,701 | Germany | July 1, 1929 |